Sept. 22, 1970     C. R. VAN NIEL     3,529,795
FASTENING DEVICE

Filed June 3, 1968     2 Sheets-Sheet 1

INVENTOR
CLARENCE R. VAN NIEL
BY
Teare, Teare & Sammon
ATTORNEYS

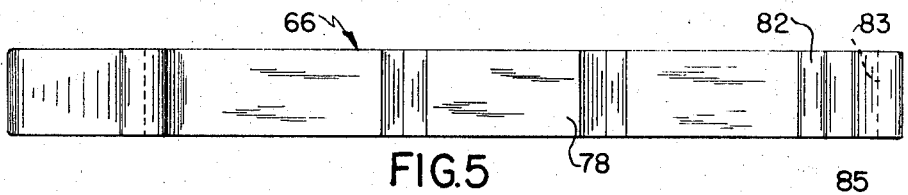
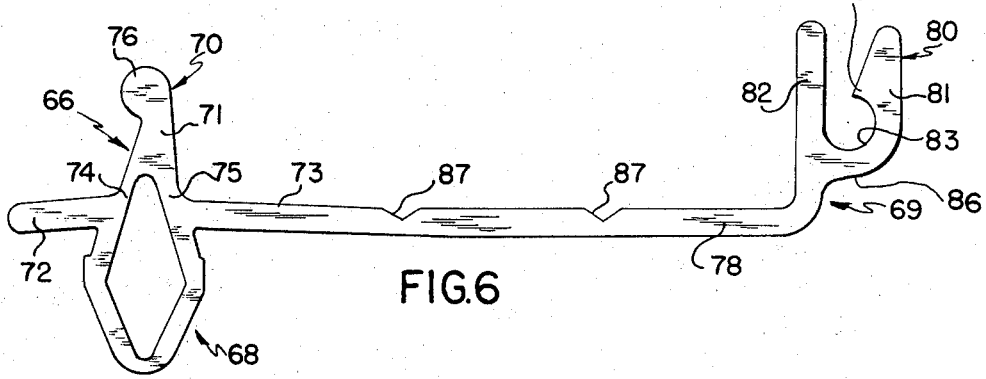
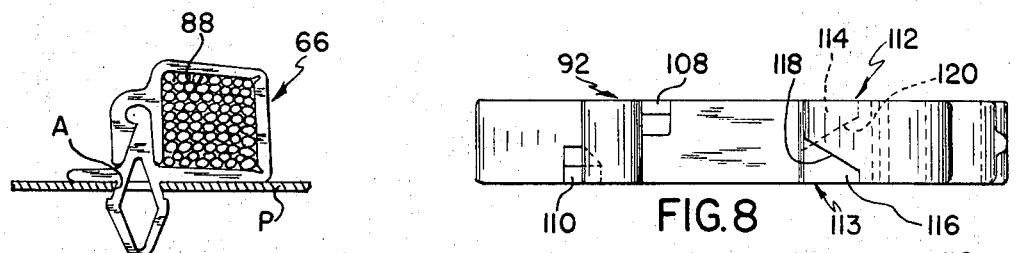
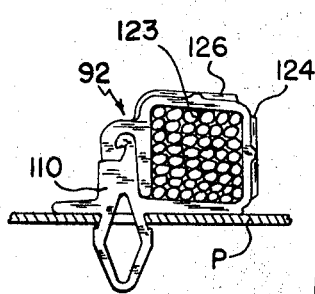
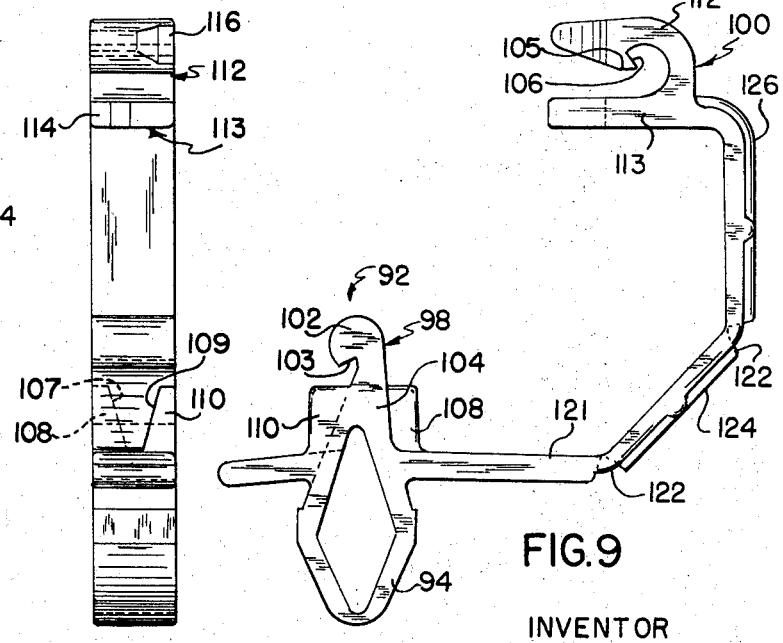
INVENTOR
CLARENCE R. VAN NIEL
BY
Teare, Teare & Sammon
ATTORNEYS United States Patent Office 3,529,795
Patented Sept. 22, 1970

3,529,795
FASTENING DEVICE
Clarence R. Van Niel, North Olmsted, Ohio, assignor, by mesne assignments, to Eaton Yale & Towne Inc., Cleveland, Ohio, a corporation of Ohio
Filed June 3, 1968, Ser. No. 734,049
Int. Cl. F16l 3/14; F16b 21/08
U.S. Cl. 248—71                                19 Claims

ABSTRACT OF THE DISCLOSURE

A fastening device including a resilient base having a deformable loop-like plug member adapted for insertion through an apertured panel and a resilient strap-like clamp member defining with the base a retainer opening for mounting articles on the panel. A resilient bridge-like member having fulcrum portions coacts with the base for deformation of the plug member upon application of pressure to the fulcrum portions, and in one form, the clamp member has a locking member for interlocking engagement with a retainer member on the bridge-like member for holding the clamping member in clamped relation around the articles.

BACKGROUND OF THE INVENTION

The present invention relates to plug-type fastening devices adapted for insertion in an aperture in a support panel, and more particularly, to those devices for use with panels of varying thickness and/or aperture dimensions. More specifically, the application relates to devices which may effectively be used with strap-like retainer members which are adapted for supporting articles on a panel member or the like.

Plug-type fastening devices having deformable bodies have heretofore been utilized for a variety of applications, such as securing two panels together or for attachment to strap-like retainer members to support articles on a panel, such as tubing, wire cables or the like.

Such previous devices have relied either on the inherent resilient characteristics of the body of the plug member to hold the plug within the aperture or, when greater holding power was required, a separate pin or plunger member was provided for insertion internally of the plug. The latter arrangement prevented inward deformation of the plug and/or caused outward deformation of the plug to secure the plug to the panel. In previous devices adapted for use with strap-like retainer members, the pin or plunger was connected adjacent one end of the strap. The integral connection of the plunger or pin with the strap is not entirely desirable in a great number of instances in that removal of the plug would usually result in a lessening of the holding power or complete disengagement of the fastening device from the panel. Furthermore, these previous devices had substantially restricted ranges of expansion and contraction limiting the panel thicknesses and/or aperture dimensions with which they could be utilized effectively.

SUMMARY OF THE INVENTION

The present invention contemplates the provision of a polymeric fastener having substantially increased holding power without the necessity of utilizing a pin or plunger member, and which is extremely well adapted for use with strap-like retainer members for supporting articles such as tubing, wire cables or the like. The fastening device includes a plug member having a loop-like body adapted for insertion in an aperture in a support panel. The plug includes a resilient deformable base having spaced portions which project outwardly from the body and which are movable with respect to one another upon insertion of the body into the aperture. The look-like body is defined by resilient, laterally spaced leg members which are connected adjacent their opposite ends. The body is closed at one end by a resilient bridging member which spans the space between the base portions, enabling the base portions to move freely inwardly, then outwardly upon insertion of the plug member in the aperture so that the legs may tightly engage the marginal edge of the aperture. A retainer member is provided which includes a clamping portion having one end attached to one of the respective base portions while the opposite end is adapted for clamping coaction with the plug member. The retainer member and associated base portion together define an article-receiving opening therebetween adapted to receive articles such as tubing, wire cables or the like.

As can be seen, the foregoing arrangement provides a fastening device which is capable of increased holding power without the necessity of inserting a pin or plunger member internally of the plug member. In addition, a device is provided which can be used effectively with a wide range of panel thicknesses and/or aperture dimensions. Furthermore, the present invention is extremely well suited for use with strap-like retainer members for supporting articles, such as tubes, wire cables or the like, enabling the strap to be temporarily disconnected without affecting the holding power of the fastener with the panel.

BRIEF DESCRIPTION OF THE DRAWINGS

FIG. 5 is a top plan view of still another embodiment of the present invention;

FIG. 6 is a side elevation view of the fastening device illustrated in FIG. 5;

FIG. 7 is a fragmentary side elevation view of the fastening device illustrated in FIG. 6 shown mounted on on support panel P in the clamped condition and supporting a plurality of articles;

FIG. 8 is a top plan view of still another embodiment of the present invention;

FIG. 9 is a side elevation view of the fastening device illustrated in FIG. 8;

FIG. 10 is a front elevation view of the fastening device illustrated in FIG. 9; and FIG. 11 is a fragmentary side elevation view of the fastening device illustrated in FIG. 8 shown mounted on a support panel P in clamped relation and supporting a plurality of articles thereon.

DESCRIPTION OF THE PREFERRED EMBODIMENTS

Figure 1:
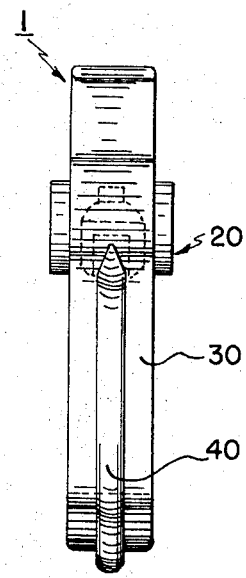
FIG. 1 is a front elevation view of the fastening device of the present invention.
Figure 2:
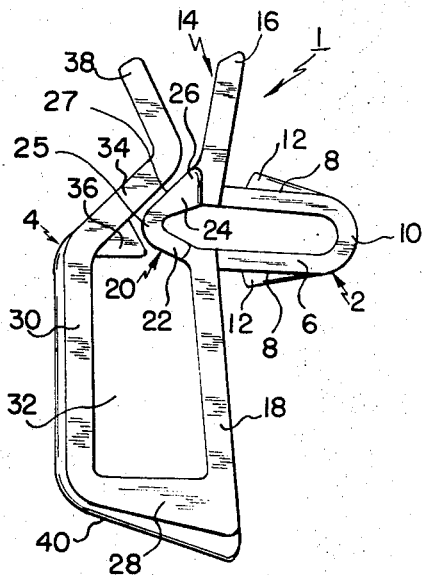
FIG. 2 is a side elevation view of the fastening device illustrated in FIG. 1.
Figure 3:
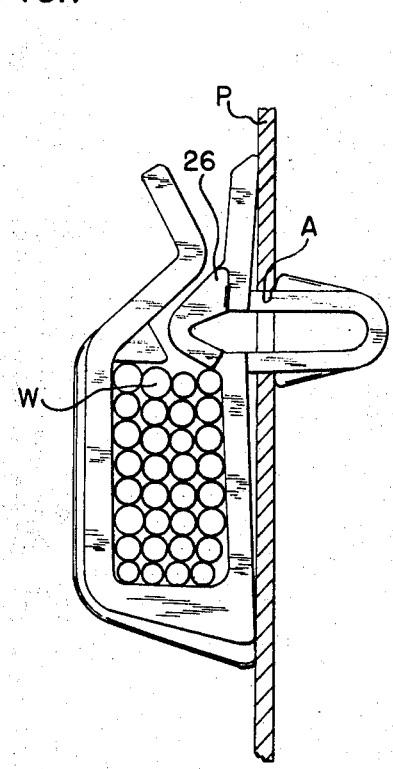
FIG. 3 is a side elevation view of the fastening device of FIG. 1 shown mounted on a support panel and supporting a plurality of articles therein.

Referring now again to the drawings and particularly to FIGS. 1 to 3 thereof, there is illustrated one form of the fastening device, designated generally at 1, made in accordance with the invention. As shown, the device includes an insert-like plug member 2 adapted to be inserted through an opening A in a support member P, such as a panel or the like. The device further includes a strap-like retainer member 4 integrally attached to the plug member 2 for receiving and mounting an article W, such as a bundle of electrical wires or the like, in supported relation on the panel P. In the form shown, the fastener device is preferably made from the polymeric material, such as nylon or the like, which is commercially available under the trademark designation Plaskon from the Allied Chemical Company.

As shown, the insert-like plug member 2 comprises a deformable loop-like body 6 having a generally U-shaped configuration. The body 6 is defined by a pair of oppositely disposed resilient legs 8 which are spaced laterally from one another and connected together at one end by a resilient bight portion 10. The exterior of the legs 8 are provided with camming surfaces on their exterior surfaces in the form of cam-like projections or lugs 12 which are inclined downwardly in a direction toward the bight portion 10 and are adapted to urge the legs toward one another upon insertion of said plug member into the opening A. By this arrangement, the lugs provide a snap-action interlocking engagement with the confronting underside of the panel P in the inserted and installed position of the plug member 2 through the opening A in the panel.

In this form, the plug member 2 is provided at its upper end with a resilient base member 14 which has a generally arched configuration in side elevation to provide a resilient mounting on the support panel P, as best seen in FIG. 3. Preferably, the base member 14 is linearly arched in an outwardly direction away from the respective legs 8. In the form shown, the base member 14 includes a first laterally extending wing portion 16 made integral with an adjacent one of the legs 8 and a second resilient wing portion 18 which defines one side of the strap-like retainer member 4, as will hereinafter be more fully described.

The loop-like body 6 is closed at its end remote from the bight portion 10 by means of a resilient bridge member 20 which is of an inverted generally U-shaped configuration. The bridge member 20, in the embodiment shown, includes a pair of resilient legs 22 and 24 connected by a bight portion 25 with the legs made integral at terminal ends with the respective wing portions 16 and 18.

The bridge member 20 is preferably of a length greater than the width of the respective wings 16 and 18 so as to provide an effective surface area for retention of the electrical wires and for providing an increased area for clamping engagement of the strap-like retainer member 4. The resilient leg 24 has a linear exterior surface 27 which is inclined in a downward and outward direction toward the wing 16. Preferably, the leg 24 terminates in a web portion 26 which has a substantially greater thickness as compared to the thickness of the leg 22. By this arrangement, increased strength characteristics are imparted to the bridge member to facilitate insertion of the plug member 2 through the opening in the panel. In addition, by this arrangement, the legs 8 are forced outwardly into progressively tighter engagement with the marginal edge of the opening A by the wings 16 and 18 as the plug member 2 is inserted through the opening A and the wings 16 and 18 are forced against the confronting surface of the panel P.

The strap-like retainer member 4 includes a generally polygonal, such as triangular shaped, bight portion 28 made integral at one end with the wing 18 and made integral at its other end with a cross-piece portion 30. The cross-piece portion 30 extends generally parallel to the wing portion 18 so as to define a polygonal, such as rectangular, window-like opening 32 therebetween. By this arrangement, the strap-like member 4 provides an enclosure for receiving therein the bundle of electrical wires, as shown in FIG. 3.

The cross-piece portion 30 terminates at one end in an inclined clamping portion 34 which extends generally parallel to the linear surface 27 of the bridge member 20. The clamping portion 34 is provided on its interior surface with an integral stop-like abutment lug 36 disposed generally at the juncture between the cross-piece 30 and the clamping portion 34. The abutment lug 36 acts to limit movement of the clamp-like portion 34 in a direction toward the base member 14.

The clamp-like portion 34 terminates at one end in an upwardly and outwardly inclined generally linearly extending actuating portion 38. The actuating portion 38 provides an abutment to facilitate insertion of the plug member 2 through the opening in the panel and provides a convenient construction for lifting the strap-like retainer member 4 toward and away from the base member 14 for assembly with the bundle of electrical wires.

In the form shown, the bight portion 28 and cross-piece portion 30 are provided with a continuous exterior reinforcement rib 40 which terminates smoothly adjacent the juncture between the cross-piece 30 and the clamping portion 34. By this arrangement, increased strength characteristics are imparted to the strap-like member while enabling the member to incorporate sufficient resilient characteristics for resiliently holding the bundle of electrical wires in clamped relation therein.

Figure 4:
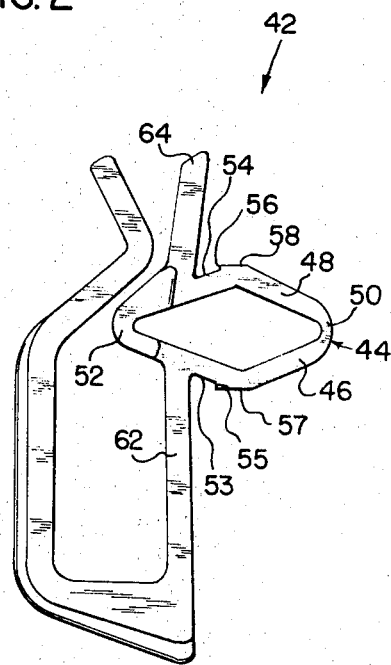
FIG. 4 is a side elevation view of another form of the present invention.

Referring now to FIG. 4, there is illustrated another form of the present invention. As shown, the fastening device 42 includes a loop-like body 44 which is generally diamond-shaped in configuration when viewed in side elevation (FIG. 4). In this form, the loop-like body 44 includes a pair of opposite disposed, generally flat leg members 46 and 48 which are connected at one end by a bight portion 50 and the opposite end by a bridging member 52, which is substantially identical with the bridging member 20 of the embodiment illustrated in FIG. 2. The legs 46 and 48 extend generally linearly and divergently apart from one another in a direction away from the bridging member 52, and then, converge lineraly toward each other merging with one another at the bight portion 50. The diverging surfaces 53 and 54 are adapted for coating interlocking engagement with the confronting surface of the panel to secure the plug member thereto. To increase the holding power of the plug member, each of the legs may be provided with projections 55 and 56 which are adapted for abutting interlocking engagement with the underside of the panel member P. The projections are preferably disposed adjacent the diverging portion of the legs 46 and 48 and are tapered in a direction away from the bight portion 50 to provide generally parallel outer surfaces 57 and 58, respectively. In addition, the width of the leg members is substantially equal to that of the wing members 62 and 64. By this arrangement, the converging portion of the legs will provide a camming abutment to urge the legs 46 and 48 inwardly toward one another upon insertion of the body 44 in an aperture, such as A, and the diverging portion of the leg members 46 and 48 will overlap the underside of the panel P to prevent removal of the device 42 after it has been inserted into the aperture A.

Referring now to FIG. 6, there is illustrated another form of the present invention. In this form, the fastening device 66 includes a loop-like body member 68, which is similar to the loop-like body shown in FIG. 4, and which is provided an elongated flexible clamping member 69. As shown, the body 68 includes a hook-like member 70 which is connected to the spaced base portions 72 and 73 by means of a resilient bridging portion 71. The resilient bridging portion includes legs 74 and 75, which are connected to the base portions 72 and 73, respectively. An enlarged head 76 is mounted adjacent the end of the bridging portion remote from the legs, which is adapted for interlocking engagement with the clamping member 69.

The clamping member 69 comprises an elongated strap-like member 78 which is integrally connected with and forms a part of the base portion 73. The opposite end of the strap member 78 is connected to a latch-like receptacle 80. The receptacle 80 includes a lug arm 81 and guide portion 82 which together define a recess 83 therebetween having a configuration conforming to the configuration of the hook-like member 70 and adapted to receive the hook-like member 70 in interlocking relation therein. The lug arm 81 includes a projection 85 which projects inwardly into the recess 83 for camming coaction with the head 76 so that the projection 85 will interlockingly overlap the underside of the head 76 in snap-action relation upon insertion of the head 76 into the recess 83. The lug arm 81 is provided with an actuating portion or shoulder 86 which is connected to and which projects generally perpendicularly away from the strap 78, and which provides a shoulder to which force may be applied to force the head 76 into the recess 83, and thus, the plug 68 into an aperture, such as A (FIG. 7).

The strap member 78 is preferably provided with a series of indentations or notches 87 disposed in predetermined relation along the length thereof. The notches are provided to facilitate the bending of the strap at predetermined points to define a generally polygonal-shape, such as rectangular or square, opening 88 (FIG. 7) to receive articles in encompassing relation therein when the fastener is in the latched condition, as shown in FIG. 7.

In another embodiment of the present invention, and as shown in FIG. 9, there may be provided a fastening device 92 which includes a loop-like body 94 similar to that of the loop-like body illustrated in FIG. 6. In this form, the fastening device 92 is provided with a latch arrangement having a hook-like member 98 which is adapted for interlocking engagement with the receptacle member 100 in a manner similar to the latch arrangement shown in FIGS. 6 and 7. The hook-like member 98 includes a head 102 which is provided with a flat locking surface 103 which is angularly disposed with respect to the external surface of the bridging portion 104, such as an acute angle, and which is adapted for overlapping abutting engagement with a complementary flat surface 106 provided on the projection 105 of the receptacle member 100. Preferably, the locking surfaces 103 and 106 are angled downwardly toward the body 94 to provide positive locking engagement of the hook-like member 98 and the receptacle member 100, and therefore, providing substantially greater tensile holding power requiring substantially greater force to disconnect the receptacle 100 from the hook-like member 98.

In addition, the fastening device 92 may also be provided with a pair of oppositely disposed abutments 108 and 110 which project in opposite directions from one another. Each of the abutments 108 and 110 are provided with inclined surfaces 107 and 109 (FIG. 10), respectively, which face inwardly toward one another. As shown, the receptacle member 100 includes a lug arm 112 and guide arm 113 which are provided with notches 114 and 116 (FIGS. 8 and 10) adjacent the opposite ends thereof, and which notches are provided with inclined surfaces 118 and 120 (FIG. 8), respectively, facing outwardly away from one another, and which are adapted for abutting engagement with the inclined surfaces 107 and 109, respectively, of the abutments 108 and 110 to prevent lateral shifting of the hook-like member 98 with respect to the receptacle member 100.

The fastening device 92 may be provided with an elongated strap member 121 which includes a plurality of indentation or notches 122 spaced predetermined spaced relation along the length thereof. These notches 122 enable the strap 121 to be bent sharply at predetermined points so that an article-receiving opening 123 may be formed which is generally polygonal, such as rectangular or square, in configuration when the fastening device is in the latched condition (FIG. 11). In this embodiment, the indentations or notches 122 are provided on the exterior of the strap member 121. In this form, rib means 124 and 126 are preferably disposed along the exterior surface of the strap member 121 between the respective notches 122, and only along those portions of the strap 121 which will not be in engagement with the support panel P, and which serve to provide additional structural strength for the strap member 121.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

I claim:

1. A fastening device adapted for insertion in an apertured support panel comprising,
  a plug member having a deformable loop-like body,
  a resilient deformable base member,
  said base member having laterally extending base portions projecting outwardly from said body,
  said base portions adapted for engagement with one side of said support panel and being moveable with respect to one another and to said panel upon insertion of said plug member in said aperture for locking said body in engagement with the confronting marginal edges of said aperture,
  said body is closed at one end by a resilient bridging member spanning the space between said base portions,
  the opposite end of said body is closed by a bight portion,
  said bridging member being of a generally inverted U-shaped configuration,
  said bight portion being generally U-shaped in configuration, and
  said bridging and body members opening in a direction toward one another to form said loop-like body.

2. A fastening device in accordance with claim 1, wherein said base member is generally arched, and wherein the angular orientation of said base portions is downwardly in a direction toward said panel.

3. A fastening device in accordance with claim 1, wherein said deformable loop-like body is defined by laterally spaced resilient leg members, said leg members supporting said base portions in spaced relation, and said leg members being movable upon movement of said base portions.

4. A fastening device in accordance with claim 1, including a strap-like retainer member connected to said plug member and adapted for supporting articles on said panel.

5. A fastening device in accordance with claim 4, wherein said retainer member includes a clamping portion connected at one end to a respective one of said base portions and defining together with said base portion an article receiving opening therebetween, and the other end of said clamping portion adapted for clamping coaction with said plug member.

6. A fastening device in accordance with claim 1, including abutment means projecting adjacent the exterior of said body adapted for interlocking engagement with the underside of said panel when said fastening device is in the installed position.

7. A fastening device in accordance with claim 1, wherein said loop-like body includes cam means inclined downwardly in a direction toward said bight portion to provide snap-action interlocking engagement with said support panel in the inserted position of said device.

8. A fastening device in accordance with claim 7, wherein said loop-like body includes projection means at one end of said cam means adjacent said base for interlocking engagement with the confronting underside of said support panel in the installed position of said plug member.

9. A fastening device in accordance with claim 1, wherein
  said loop-like body is of a generally diamond-shape in side elevation including a pair of oppositely disposed generally flat leg members connected at one end by said bight portion and at the opposite end by said bridging member, and said legs extending generally linearly and divergently apart from one another in a direction away from said bridging member, and then extending convergently linearly toward each other and merging with one another adjacent said bight portion.

10. A fastening device in accordance with claim 9, wherein projections are disposed adjacent the diverging portion of said legs for interlocking engagement with the underside of said support panel in the inserted position of said plug member.

11. A fastening device adapted for insertion in an apertured support panel comprising, a plug member having a deformable loop-like body, a resilient deformable base member, said base member having laterally extending base portions projecting outwardly from said body, said base portions being adapted for engagement with one side of said support panel and being moveable with respect to one another and to said panel upon insertion of said plug member in said aperture for locking said body in engagement with the confronting marginal edges of said aperture, said body being closed at one end by a resilient bridging member spanning the space between said base portions, a strap-like retainer member connected to said plug member for supporting articles on said panel, said retainer member includes a clamping portion connected at one end to a respective one of said base portions and defining together with said respective base portions an article receiving opening therebetween, and the other end of said clamping portion adapted for clamping coaction with said plug member.

12. A fastening device in accordance with claim 11, including a latching means adapted for interlocking said loop-like body member with said clamping portion.

13. A fastening device in accordance with claim 12, wherein said latching means includes a hook-like member connected to said loop like body, and said clamping portion includes a receptacle having a complementary configuration to the configuration of said hook-like member.

14. A fastening device in accordance with claim 11, wherein said plug member and said clamping portion include oppositely disposed abutment surfaces adapted for abutting engagement with one another to prevent lateral shifting of said plug member with respect to said clamping portion in the clamped position of said device.

15. A fastening device in accordance with claim 11, wherein said strap-like retainer member includes spaced weakened portions along the length thereof to facilitate bending of said retainer member.

16. A fastening device in accordance with claim 14, including reinforcement means disposed exteriorly of said retainer member between the respective weakened portions thereof to provide a reinforcement therefor.

17. A fastening device adapted for insertion in an apertured support panel comprising, a plug member having a deformable loop-like body, a resilient deformable base member, said base member having spaced, laterally extending base portions projecting outwardly from said body adapted for engagement with one side of said support panel and being moveable with respect to one another and to said panel upon insertion of said plug member in said aperture for locking said body in engagement with the confronting marginal edges of said aperture, said body being closed at one end and opening in a direction toward said base member, said body being closed at the opposite end by a resilient bridging member spanning the space between said base portions for enabling the base portions to move laterally toward and away from one another, a deformable retainer member connected to said plug member for supporting articles on said panel, said retainer member including a clamping portion connected at one end to a respective one of said base portions and defining together with said respective base portion an article receiving opening therebetween, and the other end of said clamping portion adapted for clamping coaction with said plug member.

18. A fastening device in accordance with claim 17, including a latching means adapted for interlocking said loop-like body member with said clamping portion.

19. A fastening device in accordance with claim 17, wherein said latching means includes complementary configured portions on said loop-like body and said clamping portion adapted for snap-action interlocking engagement with one another.

References Cited
UNITED STATES PATENTS

| 3,015,869 | 1/1962 | Rapata | 248—71 X |
|---|---|---|---|
| 3,169,004 | 2/1965 | Rapata | 248—74 X |
| 3,341,903 | 9/1967 | Buntic | 24—16 |
| 3,423,055 | 1/1969 | Fischer | 248—73 |
| 2,658,247 | 11/1953 | Heuer | 24—73 |

CHANCELLOR E. HARRIS, Examiner

U.S. Cl. X.R.

24—16; 248—74